(12) United States Patent
Wang et al.

(10) Patent No.: US 10,467,548 B2
(45) Date of Patent: Nov. 5, 2019

(54) METHOD, APPARATUS AND SYSTEM FOR BIOMETRIC IDENTIFICATION

(71) Applicant: Huami Inc., Sunnyvale, CA (US)

(72) Inventors: Fei Wang, Fremont, CA (US); Ting Chen, San Jose, CA (US)

(73) Assignee: Huami Inc., Mountain View, CA (US)

( * ) Notice: Subject to any disclaimer, the term of this patent is extended or adjusted under 35 U.S.C. 154(b) by 739 days.

(21) Appl. No.: 14/996,894

(22) Filed: Jan. 15, 2016

(65) Prior Publication Data

US 2017/0091595 A1 Mar. 30, 2017

Related U.S. Application Data

(63) Continuation-in-part of application No. 14/869,088, filed on Sep. 29, 2015, now Pat. No. 9,787,676.

(51) Int. Cl.
*G06N 20/00* (2019.01)
*G06F 21/32* (2013.01)
(Continued)

(52) U.S. Cl.
CPC ............ *G06N 20/00* (2019.01); *G06F 21/32* (2013.01); *G06K 9/00536* (2013.01);
(Continued)

(58) Field of Classification Search
CPC ...... G06K 9/66; G06K 9/00885; G06K 9/481; G06K 9/6202; G06K 2009/00939; G06F 21/32; G06N 3/088; G06N 99/005
See application file for complete search history.

(56) References Cited

U.S. PATENT DOCUMENTS

| 4,809,705 A | 3/1989 | Ascher |
| 6,970,737 B1 | 11/2005 | Brodnick et al. |

(Continued)

FOREIGN PATENT DOCUMENTS

| CN | 103284702 A | 9/2013 |
| CN | 103598877 A | 2/2014 |

(Continued)

OTHER PUBLICATIONS

Lugovaya, et al., "Biometric Human Identification Based on ECG", PhysioNet, Mar. 5, 2014 (Year: 2014).*

(Continued)

*Primary Examiner* — Scott A. Waldron
*Assistant Examiner* — Tsu-Chang Lee
(74) *Attorney, Agent, or Firm* — Young Basile Hanlon & MacFarlane, P.C.

(57) ABSTRACT

Method and apparatus for processing a biometric measurement signal using a computing device, including receiving a biometric measurement signal generated by contact with a single individual, extracting at least one periodic fragment from the biometric measurement signal, generating first feature data at least partially based on the at least one extracted periodic fragment, determining second feature data from the first feature data by removing data from the first feature data using robust principal component analysis, determining whether a match exists between the second feature data and defined biometric data associated with a known individual by processing the second feature data and the defined biometric data using a machine learning technique, and in response to determining a match exists between the second feature data and the defined biometric data, transmitting a signal indicating that the single individual is the known individual.

15 Claims, 6 Drawing Sheets

(51) Int. Cl.
  G06K 9/00 (2006.01)
  G06K 9/62 (2006.01)
  H04L 29/06 (2006.01)
  G06N 3/04 (2006.01)
  G06N 3/08 (2006.01)
(52) U.S. Cl.
  CPC ....... G06K 9/00885 (2013.01); G06K 9/6272 (2013.01); G06N 3/0454 (2013.01); G06N 3/08 (2013.01); H04L 63/0861 (2013.01); G06K 2009/00939 (2013.01)

(56) References Cited

U.S. PATENT DOCUMENTS

| | | | |
|---|---|---|---|
| 7,171,269 | B1 | 1/2007 | Addison et al. |
| 7,630,521 | B2 * | 12/2009 | Kim ................... G06K 9/00496 382/115 |
| 8,049,597 | B1 | 11/2011 | Murakami et al. |
| 8,762,733 | B2 | 6/2014 | Derchak et al. |
| 8,842,891 | B2 * | 9/2014 | Nagesh .............. G06K 9/00288 382/115 |
| 8,994,498 | B2 | 3/2015 | Agrafioti et al. |
| 9,633,168 | B2 | 4/2017 | Lindsay |
| 9,787,676 | B2 | 10/2017 | Wang et al. |
| 2002/0019826 | A1 * | 2/2002 | Tan ..................... G06F 17/3071 |
| 2003/0135097 | A1 | 7/2003 | Wiederhold et al. |
| 2006/0106571 | A1 | 5/2006 | Kim et al. |
| 2006/0161065 | A1 | 7/2006 | Elion |
| 2007/0253624 | A1 | 11/2007 | Becker |
| 2010/0090798 | A1 | 4/2010 | Garcia Molina et al. |
| 2011/0254662 | A1 | 10/2011 | Lindsay |
| 2014/0120876 | A1 | 5/2014 | Shen |
| 2014/0188770 | A1 | 7/2014 | Agrafioti et al. |
| 2014/0361871 | A1 | 12/2014 | Silva et al. |
| 2015/0135310 | A1 | 5/2015 | Lee |
| 2015/0199010 | A1 | 7/2015 | Coleman et al. |
| 2015/0220716 | A1 | 8/2015 | Aronowitz et al. |
| 2016/0270668 | A1 | 9/2016 | Gil |
| 2016/0367138 | A1 | 12/2016 | Kim et al. |
| 2016/0378965 | A1 | 12/2016 | Choe et al. |

FOREIGN PATENT DOCUMENTS

| | | |
|---|---|---|
| CN | 104523266 A | 4/2015 |
| EP | 2526859 A1 | 11/2012 |
| KR | 20150029105 A | 3/2015 |
| WO | 2004030756 A1 | 4/2004 |
| WO | 2014022906 A1 | 2/2014 |
| WO | 2015047015 A1 | 4/2015 |
| WO | 2015051253 A2 | 4/2015 |

OTHER PUBLICATIONS

Yang et al., "Deep Convolutional Neural Networks on Multichannel Time Series for Human Activity Recognition", Proceedings of the Twenty-Fourth International Joint Conference on Artificial Intelligence (IJCAI 2015), Jul. 25-31, 2015 (Year: 2015).*

Wright et al., "Robust Principal Component Analysis: Exact Recovery of Corrupted Low-Rank Matrices by Convex Optimization", NIPS'09 Proceedings of the 22nd International Conference on Neural Information Processing Systems, Dec. 7-10, 2009 (Year: 2009).*

He et al., "Robust Principal Component Analysis Based on Maximum Correntropy Criterion", IEEE Transactions on Image Processing, vol. 20, No. 6, Jun. 2011 (Year: 2011).*

Aldroubi et al., "Reduced row echelon form and non-linear approximation for subspace segmentation and high-dimensional data clustering", Appl. Comput. Harmon. Anal.37 (2014) 271-287 (Year: 2014).*

Belinda et al., "iiCardiac Rhythm—Biometric based Secure Authentication for IEEE 802.15.6", International Conference on Science, Engineering, and Management Research—ICSEMR 2014 (Year: 2014).*

Sun, Yi, Yuheng Chen, Xiaogang Wang, and Xiaoou Tang. "Deep learning face representation by joint identification-verification." In Advances in Neural Information Processing Systems, pp. 1988-1996. 2014.

DeepID2 http://blog.csdn.net/stdcoutzyx/article/details/41497545.

Deep Learning and Biometrics http://icb2015.org/media/DL-Bio-final.pdf.

Jin LinPeng, Dong Jun. Deep learning research on clinical electrocardiogram analysis. , 2015, 45(3): 398-416.

Stober, Sebastian, Daniel J. Cameron, and Jessica A. Grahn. Using Convolutional Neural Networks to Recognize Rhythm.

Kaguara, Antony, Kee Myoung Nam, and Siddarth Reddy. "A deep neural network classifier for diagnosing sleep apnea from ECG data on smartphones and small embedded systems."

Zheng, Yi, Qi Liu, Enhong Chen, Yong Ge, and J. Leon Zhao. "Time series classification using multi-channels deep convolutional neural networks." In Web-Age Information Management, pp. 298-310. Springer International Publishing, 2014.

Tantawi, M.; Salem, A.; Tolba, M. F.:Fiducial Based Approach to ECG Biometrics Using Limited Fiducial Points. In: Advanced Machine Learning Technologies and Applications Communications in Computer and Information Science, vol. 488, pp. 199-210 (2014).

Singh, Y.N.; Gupta, P.: ECG to Individual Identification. In: Proc. of the 2nd IEEE BTAS Conf., pp. 1-8 (2008).

Agrafioti, F.; Hatzinakos, D.:ECG Based Recognition Using Second Order Statistics. Communication Networks and Services Research Conference, vol., No., pp. 82,87, 5-8 (2008).

Biel L. et al. ECG analysis: A new approach in human identification. IEEE Trans. Instrum. Meas. 2001;50:808-812.

Shen T. W. PhD. Thesis. University of Wisconsin; Madison, WI, USA: 2005. Biometric Identity Verification Based on Electrocardiogram (ECG).

Wang L. M.S. Thesis. Shan Dong University; Jinan, China: 2005. The Research Based on the ECG Human Identification Technology.

Chiu C.C., et al. A Novel Personal Identity Verification Approach Using a Discrete Wavelet Transform of the ECG Signal. MUE 2008; Busan, Korea. Apr. 24-26, 2008; pp. 201-206.

Lugovaya T.S. Biometric human identification based on electrocardiogram. [Master's thesis] Electrotechnical University "LETI", Saint-Petersburg, Russian Federation; Jun. 2005.

Kavasaoglu, A. Resit, Kemal Polat b, n, M. Recep Bozkurt a, A novel feature ranking algorithm for biometric recognition with PPG signals, Computers in Biology and Medicine 49, 2014.

* cited by examiner

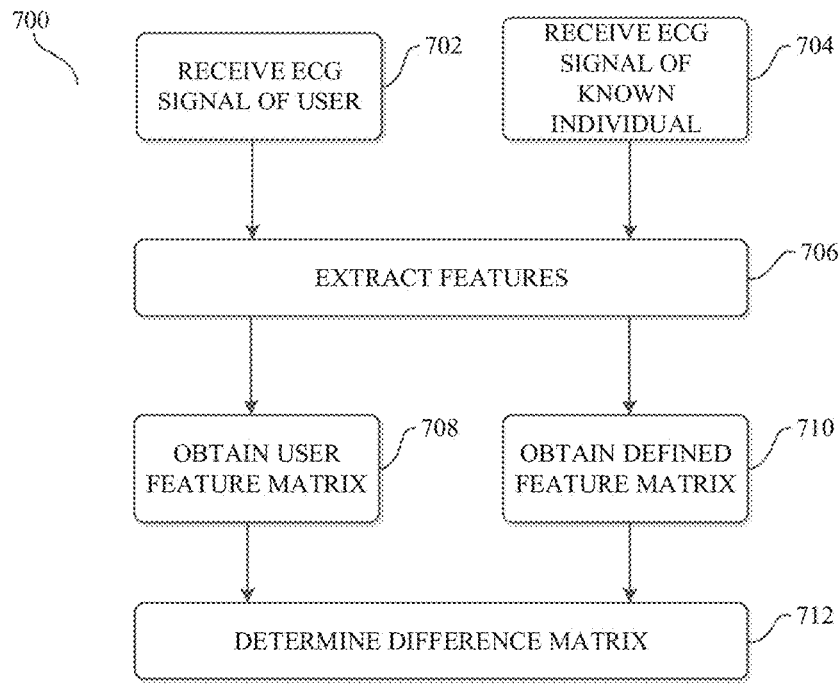
FIG. 7
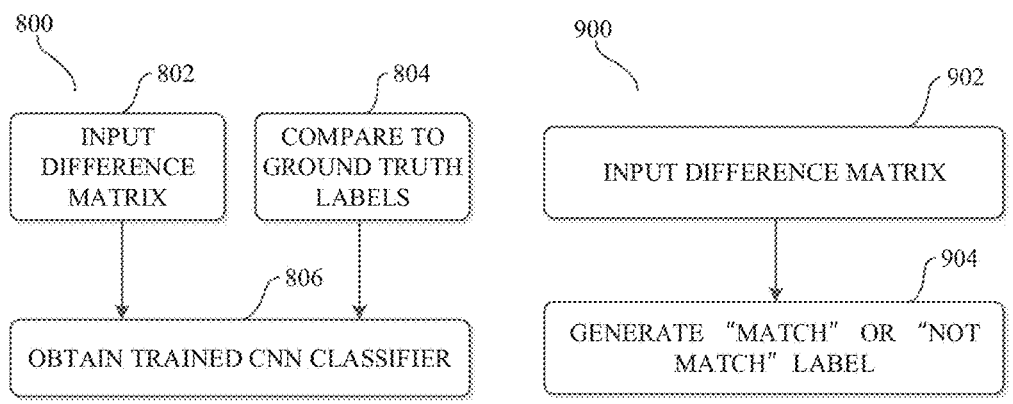
FIG. 8
FIG. 9

METHOD, APPARATUS AND SYSTEM FOR BIOMETRIC IDENTIFICATION

CROSS-REFERENCE TO RELATED APPLICATION

This application is a continuation-in-part of U.S. patent application Ser. No. 14/869,088 titled "Multi-Modal Biometric Identification," filed Sep. 29, 2015, the contents of which is incorporated herein by reference in its entirety.

TECHNICAL FIELD

This disclosure relates in general to identify a unique individual with a biometric measurement signal using machine learning techniques such as deep learning.

BACKGROUND

Biometric information has been widely used in identification of individuals in various scenarios, such as access control. Such information conventionally includes fingerprints, DNA, eye retinas, facial characteristics, and so forth.

Deep learning (DL) is a branch of machine learning techniques for modeling high-level abstractions in data. DL techniques have been used for applications such as face recognition, voice-to-text conversion, and for assisting medical diagnostics, e.g. disease classification using recorded physiological signals. DL techniques can use, for example, multiple processing layers with complex structure, or multiple non-linear transformations.

SUMMARY

Disclosed herein are implementations of methods, apparatuses and systems for biometric identification.

In one aspect, the present disclosure includes a method for processing a biometric measurement signal using a computing device comprising receiving a biometric measurement signal generated by contact with a single individual, extracting periodic fragments from the biometric measurement signal, generating first feature data based on the extracted periodic fragments from the biometric measurement signal, determining second feature data from the first feature data by removing noisy data from the first feature data using robust principal component analysis (RPCA), determining whether a match exists between the second feature data and defined biometric data associated with a known individual by processing the second feature data and the defined biometric data using a machine learning technique, and in response to determining a match exists between the second feature data and the defined biometric data, transmitting a signal indicating that the single individual is the known individual.

In another aspect, the present disclosure includes an apparatus for processing a biometric measurement signal comprising a non-transitory memory and a processor configured to execute instructions stored in the non-transitory memory to receive a biometric measurement signal generated by contact with a single individual, extract periodic fragments from the biometric measurement signal, generate first feature data based on the extracted periodic fragments, determine second feature data from the first feature data by removing noisy data from the first feature data using RPCA, determine whether a match exists between the second feature data and defined biometric data associated with a known individual by processing the second feature data and the defined biometric data using a machine learning technique, and in response to determining a match exists between the second feature data and the defined biometric data, transmit a signal indicating that the single individual is the known individual.

In another aspect, the present disclosure includes an apparatus comprising a body, a biometric sensor coupled to the body to produce a biometric measurement signal when activated by contact with an single individual, a memory, and at least one communication device coupled to the body and controlled by a processor to wirelessly transmit the biometric measurement signal from the biometric sensor to an external server, wherein first feature data is generated based on periodic fragments extracted from the biometric measurement signal, wirelessly receive a first signal from the external server indicative of a biometric identification data generated from the biometric measurement signal, wherein the first signal is determined based on second feature data generated by removing noisy data from the first feature data using RPCA, and the second feature data is compared with defined biometric data associated with a known individual using a machine learning technique to determine whether a match exists indicating that the single individual is the known individual, and wirelessly transmit a second signal to an identification device in response to a match indicating that the single individual is the known individual.

The embodiments or implementations can be configured as executable computer program instructions stored in computer storages such as memory.

BRIEF DESCRIPTION OF THE DRAWINGS

The description here makes reference to the accompanying drawings wherein like reference numerals refer to like parts throughout the several views, and wherein:

FIG. 7 is a flowchart showing an example process of comparing biometric measurement data of a user and a known individual according to implementations of this disclosure;

FIG. 8 is a flowchart showing an example setup process using a convolutional neural network (CNN) model according to implementations of this disclosure;

FIG. 9 is a flowchart showing an example process of determining whether a match exists using the CNN model in FIG. 8 according to implementation of this disclosure.

DETAILED DESCRIPTION

Example implementations of the present disclosure will be described below with reference to the accompanying drawings. The same numbers across the drawings set forth in the following description represent the same or similar elements, unless differently expressed. The implementations set forth in the following description do not represent all implementations or embodiments consistent with the present disclosure; on the contrary, they are only examples of apparatuses and methods in accordance with some aspects of this disclosure as detailed in the claims.

A biometric characteristic is applicable as a means to identify a person, if for any individual the characteristic is: universal, meaning that any individual possesses one; easily measured, both technically and procedurally; unique, meaning that no two individuals share identical measurements; and permanent, meaning that the characteristic of the individual does not change over time. Further, when implemented by a wearable device, the biometric measurement signal can have instantaneity that means the measurement should take a small amount of time; accuracy that means the measurement should not misidentify the individual as another person; and security that means the characteristic should not be easily copied or inappropriately possessed by other individuals. The biometric measurement signal used in implementations of this disclosure can be associated with, for example, a voice, a hand-writing, a hand geometry, a fingerprint, a palm print, an iris characteristic, a facial characteristic, an electrocardiogram (ECG) signal, an electroencephalography (EEG) signal, a photoplethysmography (PPG) signal, an electromyography (EMG) signal, or a combination of the above.

Figure 1:
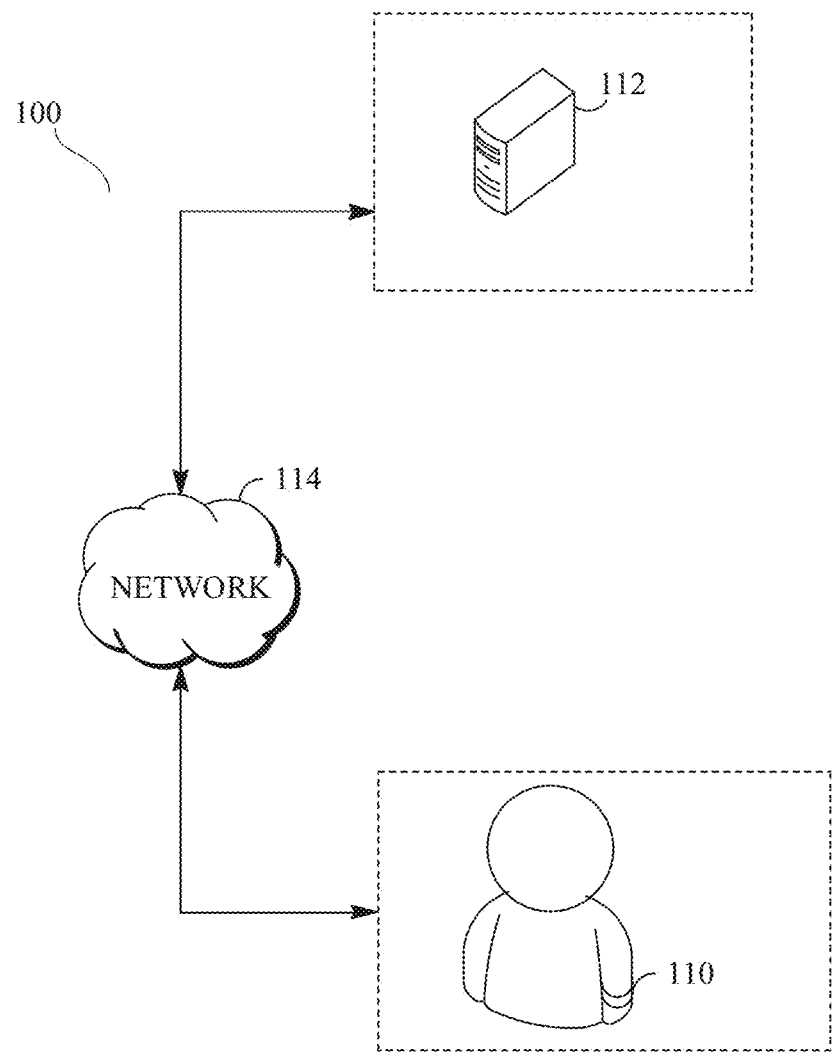
FIG. 1 is a diagram of a system configuration for a biometric identification device and a computer device according to implementations of this disclosure.

FIG. 1 is a diagram of a system configuration 100 for a biometric identification device 110 and a computing device 112 according to implementations of this disclosure.

Biometric identification device 110 as shown is a wearable biometric identification device, namely a device worn around an individual's wrist. However, other devices can be used. For example, device 110 could instead be implemented by another wearable device such as a ring or necklace. Alternatively, device 110 could be implemented as another portable device that is configured to travel with an individual, but not be worn by the individual, such as a device similar in form to a key fob. Computing device 112 can be implemented by any configuration of one or more computers, such as a remote server computer, a personal computer, a laptop computer, a tablet computer, a cell phone, a personal data assistant (PDA), or a computing service provided by a computing service provider, e.g., a website, cloud computing. For example, certain operations described herein can be performed by a computer (e.g., a server computer) in the form of multiple groups of computers that are at different geographic locations and can or can not communicate with one another, such as by way of network 120. While certain operations can be shared by multiple computers, in some implementations, different computers are assigned different operations. For example, one or more computing devices, such as a cell phone, could be used to receive and process biometric identification data as described hereinafter, and transmit a signal to biometric identification device 110 and/or elsewhere confirming or denying a match.

In another implementation, an intermediate device (not shown in FIG. 1), can be used to establish a connection to biometric identification device 110 carried or wore by a user, receive a biometric measurement signal of the user from device 110, transmit the biometric measurement signal to computing device 112, such as a remote server, to process the biometric measurement signal. The computing device determines whether the user is a known individual, and transmits a result signal back to the intermediate device. Prior to transmitting the biometric measurement signal to computing device 112, the intermediate device can preprocess the signal. The result signal transmitted back from computing device 112 can be used to indicate the user at the intermediate device, or alternatively, the result signal is further transmitted to biometric identification device 110 by the intermediate device and indicate the user at device 110. The intermediate device can be a computer or part of a computer, e.g., a cell phone, a PDA, a tablet computer, or a personal computer.

In some implementations, one or more computing devices 112, such as a cell phone, can receive a result signal from a remote device (not shown in FIG. 1), after an identity of the user carrying or wearing biometric identification device 110 is determined. The remote device itself can also be a computer or part of a computer, e.g., another cell phone or a remote server.

Network 150 can be one or more communications networks of any suitable type in any combination, including networks using Bluetooth communications, infrared communications, near field connections (NFC), wireless networks, wired networks, local area networks (LAN), wide area networks (WAN), cellular data networks and the Internet. Biometric identification device 110 and computing device 112 can communicate with each other via network 120. In the implementations described herein, one network 150 is shown. Where more than one computing device 112 is used. In some implementations, each computing device 112 can be connected to the same network or to different networks.

Figure 2:
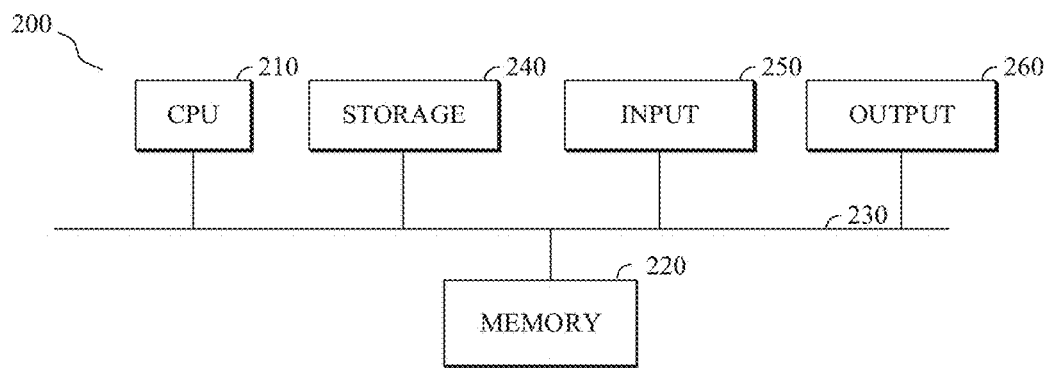
FIG. 2 is a block diagram of a hardware configuration for a biometric identification device and/or a computing device according to implementations of this disclosure.

FIG. 2 is a block diagram of a hardware configuration for a biometric identification device and/or a computing device according to implementations of this disclosure. For example, biometric identification device 110 and/or computing device 112 can use hardware configuration 200.

Hardware configuration 200 can include at least one processor such as central processing unit (CPU) 210. Alternatively, CPU 210 can be any other type of device, or multiple devices, capable of manipulating or processing information now-existing or hereafter developed. Although the examples herein can be practiced with a single processor as shown, advantages in speed and efficiency can be achieved using more than one processor.

Memory 220, such as a random access memory device (RAM), a read-only memory device (ROM), or any other suitable type of storage device, stores code and data that can be accessed by CPU 210 using a bus 230. The code can include an operating system and one or more application programs processing and/or outputting the data. As will be discussed in detail below, an application program can include software components in the form of computer executable program instructions that cause CPU 210 to perform some or all of the operations and methods described herein. In some implementations, hardware configuration 200 is used to implement computing device 112, in which an application program stored by memory 220 can implement some or all of a process according to FIG. 6 as described in more detail below.

Hardware configuration 200 can optionally include a storage device 240 in the form of any suitable non-transitory computer readable medium, such as a hard disc drive, a memory device, a flash drive or an optical drive. Storage device 240, when present, can provide additional memory when high processing requirements exist. Storage device 240 can also store any form of data, relating or not relating to biometric identification.

Hardware configuration 200 can include one or more input devices 250, such as a keyboard, a numerical keypad, a mouse, a microphone, a touch screen, a sensor, or a gesture-sensitive input device. Through input device 250, data can be input from the user or another device. For example, a gesture-sensitive input device can receive different gestures to switch between different display modes (e.g., heart rate, time, ECG). Any other type of input device 250, including an input device not requiring user intervention, is possible. For example, input device 250 can be a communication device such as a wireless receiver operating according to any wireless protocol for receiving signals. In some implementations, when hardware configuration 200 is used to implement computing device 112, input device 250 can be a wireless receiver for receiving input signals from biometric identification device 110. In another implementation, when hardware configuration 200 is used to implement biometric identification device 110, input device 250 can a wireless receiver for receiving result signals from computing device 112. Input device 250 can output signals or data, indicative of the inputs, to CPU 210, e.g., along bus 230.

Hardware configuration 200 can include one or more output devices 260. Output device 260 can be any device transmitting a visual, acoustic, or tactile signal to the user, such as a display, a touch screen, a speaker, an earphone, a light-emitting diode (LED) indicator, or a vibration motor. If output device is a display, for example, it can be a liquid crystal display (LCD), a cathode-ray tube (CRT), or any other output device capable of providing visible output to an individual. In some cases, an output device 260 can also function as an input device 250—a touch screen display configured to receive touch-based input, for example. Output device 260 can alternatively or additionally be formed of a communication device for transmitting signals. For example, output device 260 can include a wireless transmitter using a protocol compatible with a wireless receiver of biometric identification device 110 to transmit signals from computing device 112 to biometric identification device 110.

Although FIG. 2 depicts one hardware configuration 200 that can implement computer device 112, other configurations can be utilized. The operations of CPU 210 can be distributed across multiple machines or devices (each machine or device having one or more of processors) that can be coupled directly or across a local area or other network. Memories 220 can be distributed across multiple machines or devices such as network-based memory or memory in multiple machines performing operations that can be described herein as being performed using a single computer or computing device for ease of explanation. Although a single bus 230 is depicted, multiple buses can be utilized. Further, storage device 240 can be a component of hardware configuration 200 or can be a shared device that is accessed via a network. The hardware configuration of a computing system as depicted in an example in FIG. 2 thus can be implemented in a wide variety of configurations.

Figure 3:
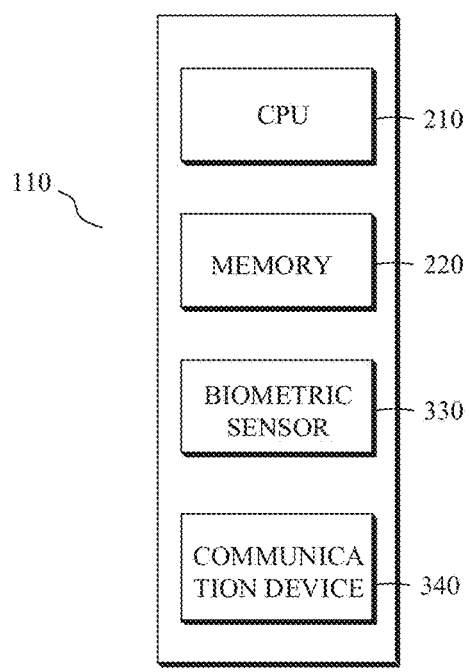
FIG. 3 is a block diagram of a hardware configuration for a biometric identification device and/or a computing device according to implementations of this disclosure.

As a generalized configuration is represented by hardware configuration 200, a more specific hardware configuration for biometric identification device 110 is illustrated as a block diagram in FIG. 3 according to implementations of this disclosure.

In some implementations, biometric identification device 110 comprises CPU 210, memory 220, biometric sensor 330, and communication device 340. CPU 210 and memory 220 can be any implementation as set forth in the description of FIG. 2. Biometric sensor 330 can be configured to be one or more biometric sensors that measure one or more biometric measurement signals of the user or devices that collect biometric data of the user, e.g., by contacting or interacting with the user. The biometric measurement can be a process with or without the user providing indication of starting the measurement to biometric identification device 110 and/or inputting data during the measurement process, in which the indication or data, if incurred, is transmitted via communication device 340. Biometric sensor 330 can be a microphone, a camera, a touch screen, a fingerprint reader, an iris scanner, an ECG sensor, an EEG sensor, a PPG sensor, an EMG sensor, or a combination of a plurality of the abovementioned sensors.

Communication device 340 is configured to input and/or output signal to biometric identification device 110, which can be any implementation of input device 250 and/or output device 260 or a combination thereof. In some implementations, communication device 340 further includes a display for presenting output to indicate the successful identification of the user. In a further implementation, the display is a touch screen display configured to receive touch-based input, for example, in manipulating data outputted thereto. In another implementation, communication device 340 can be configured to receive a signal from computing device 112, an intermediate device, or a remote device as set forth in aforementioned description.

A configuration of biometric identification device 110 is described in more detail with reference to FIG. 4 and FIG. 5.

Figure 4:
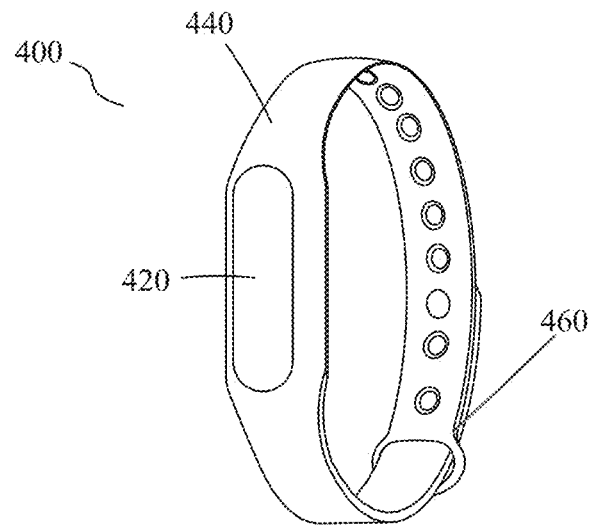
FIG. 4 is a diagram of an example biometric identification device according to implementations of this disclosure.

FIG. 4 is diagram of an example biometric identification device according to implementations of this disclosure. In this example, device 110 is shown as a wristband device 400. Although wristband device 400 is shown as having a module 420 secured to a wrist band 440, other devices that can be worn on an individual's body can be used, such as wearables on the user's arms, wrists or fingers. The module 420 of wristband device 400 can include, for example, CPU 210, memory 220, one or more biometric sensors 330 and one or more communication devices 340. Securing mechanism 460 can also be included to secure band 440 to the user.

Figure 5:
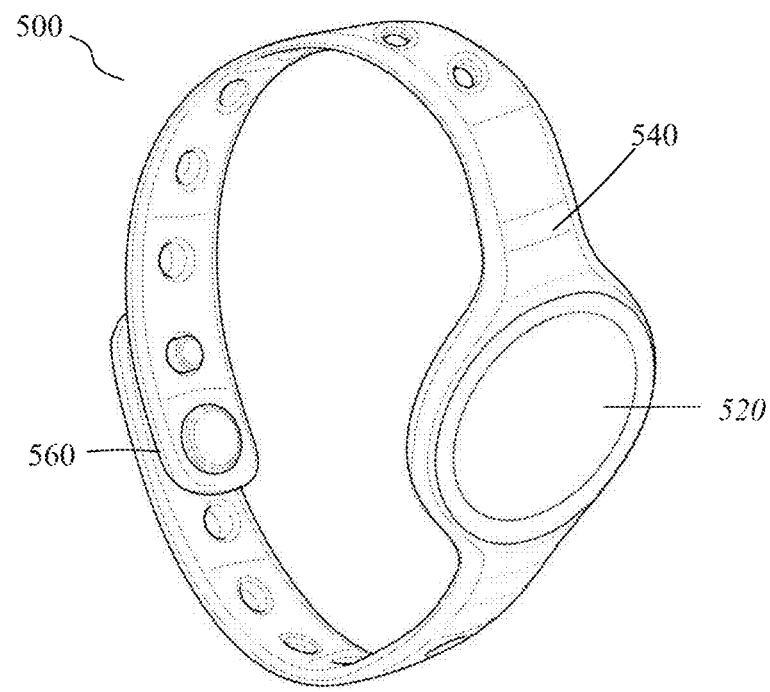
FIG. 5 is a diagram of an example biometric identification device according to implementations of this disclosure.

FIG. 5 is diagram of an example biometric identification device according to implementations of this disclosure. In this example, device 110 is shown as a "smart" watch 500.

Although watch 500 is shown as having a module 520 secured to a wrist band 540, other devices that can be worn on an individual's body can be used, such as wearables on the user's arms, wrists or fingers. The module 520 of watch 500 can include, for example, CPU 210, memory 220, one or more biometric sensors 330 and one or more communication devices 340. Securing mechanism 560 can also be included to secure band 540 to the user.

In some implementations, securing mechanism 460 and/or 560 is a slot and peg configuration. In other implementations, securing mechanism 460 and/or 560 can include a snap-lock configuration. It will be apparent to one skilled in the art in view of the present disclosure that various configurations can be contemplated for securing mechanism 460 and/or 560.

Figure 6:
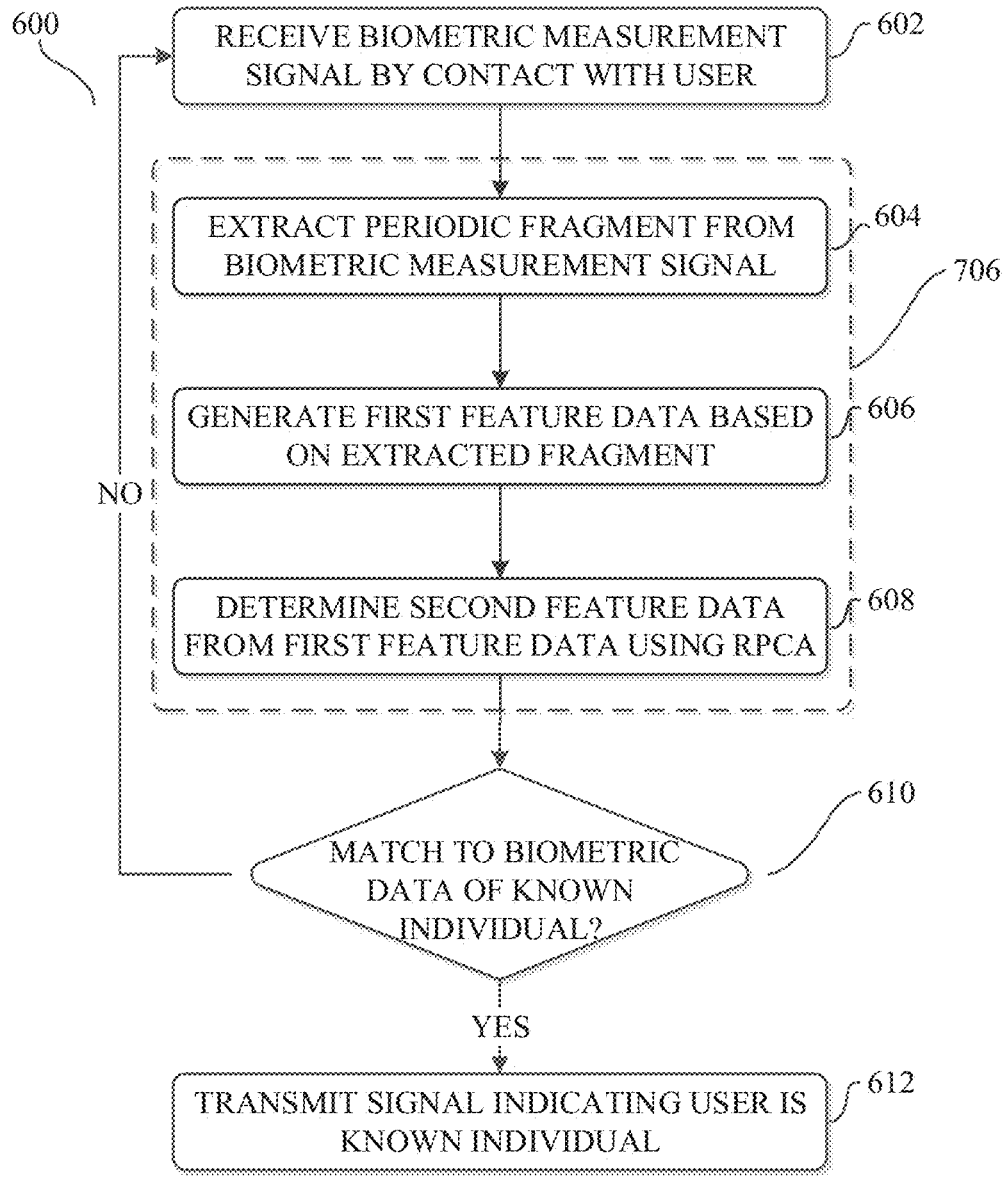
FIG. 6 is a flowchart showing an example process of processing a biometric measurement signal according to implementations of this disclosure.

FIG. 6 is a flowchart showing an example process of processing a biometric measurement signal according to implementations of this disclosure. The operations described in method 600 can be performed at one or more computing devices, e.g., a computing device 112 such as a remote server, or an intermediate device such as a cell phone, or at the biometric identification device 110, or a combination of the above. When an operation is performed by one or more such computing devices, it is completed when it is performed by one such computing device. The operations described in method 600 can be implemented in memory 220 including program instructions executable by CPU 210 that, when executed, cause CPU 210 to perform the operations.

For simplicity of explanation, method 600 is described below as performed by computing device 112. Accordingly, a biometric measurement signal can be received at computing device 112 from biometric identification device 110 through, for example, communication device 340 at operation 602. Also in this example, only ECG signals are discussed. However, other types or multiple biometric measurement signals can be similarly processed. In some implementations, measuring biometric measurement signals ends after a defined period of time lapses. In other implementations, measuring biometric measurement signals ends when contact of the individual with a sensor ends.

At operation 602, a biometric measurement signal, generated by biometric identification device 110 by contact with a user, is received. The biometric measurement signal can be of any signal measured and generated by any kind of biometric sensor set forth herein. The biometric measurement signal contains characteristics, information or data that is associated with the user. In some implementations, the biometric measurement signal is an ECG signal. Receiving is defined herein as inputting, acquiring, reading, accessing or in any manner inputting a biometric measurement signal. For example, the biometric measurement signal is received via communication device 340 of computing device 112, such as a server or a personal computer. In another implementation, the biometric measurement signal is received via communication device 340 of an intermediate device, such as a cell phone or a tablet computer, which further transmits the signal to computing device 112. In another implementation, the intermediate device can pre-process the biometric measurement signal prior to transmitting the same to computing device 112. In another implementation, the pre-processing of the biometric measurement signal can be performed at computing device 112.

The pre-processing includes a number of manipulations to the biometric measurement signal to ensure data integrity and to prepare the signal for subsequent processing. The type of pre-processing varies according to type of signal, but it generally involves removing noise of raw signals (e.g., denoising) measured by the sensors. In some implementations, the pre-processing can include removing baseline wander in the raw signals. This processing generally adjusts the input signals during one measurement cycle to a common baseline. In another implementation, the pre-processing can include filtering, such as using a band pass filter, which can remove any undesirable data shifts that occurred while the raw signals were being measured and to reduce the presence of data outside of a range to be observed (e.g., outliers). In some implementations, techniques such as wavelet transform and support vector machines (SVM) can used to remove outliers and noises from the data.

At operation 604, one or more periodic fragment is extracted from the biometric measurement signal. The one or more periodic fragments can be portions of the biometric signal that presents periodical characteristics. Optionally, the biometric measurement signal can be pre-processed. In some implementations, the biometric measurement signal can be an ECG signal and the one or more periodic fragments are PQRST cycles of the ECG signal, in which each periodic fragment contains one or more complete PQRST cycles. A PQRST cycle of an ECG signal is defined as a portion of the ECG signal that represents one complete heartbeat, which consists of a P-wave, a QRS complex and a T-wave connected in temporal order. The peak of a QRS complex is defined as an R-peak. For example, after detecting R-peaks, ECG periodic fragments (e.g., QRS complexes) can be extracted from the pre-processed signal based on R-peaks by, for example, directly taking signal data around the R-peaks, or any other technique that can be used to extract ECG periodic fragments. In some implementations, an extracted periodic fragment can be represented by an image, or a vector. Other data structures are also possible.

At operation 606, first feature data is generated by computer device 112, at least partially based on the extracted periodic fragments from the biometric measurement signal. In some implementations, the first feature data can be an aggregated data structure, which is generated by aggregating one or more extracted periodic fragments represented as images or vectors. For example, the periodic fragments can be represented as images in which each image can represent one or more periodic fragment, and an aggregated image can be generated by stacking an image on top of another image.

In another example, the periodic fragments can be represented as vectors in which each vector can represent one or more periodic fragment, and an aggregated image or matrix can be generated by placing a vector side by side with another vector. The vectors representing periodic fragments, if used, can be either row vectors or column vectors, both being equivalent to each other. For convenience, the vectors representing periodic fragments set forth hereinafter refer to row vectors, in which case each row of the aggregated matrix represents a periodic fragment accordingly. The form and the generation method of the first feature data are not limited to what is set forth herein. Any person skilled in the art should realize that other techniques, processes, methods or algorithms can be used to generate the aggregated data structure that incorporates characteristic information of the extracted periodic fragments and can be processed by a computer program.

At operation 608, second feature data is determined from the first feature data by computer device 112, by removing noisy data from the first feature data using robust principal component analysis (RPCA). RPCA is a statistical procedure that can be used in processing corrupted data, such as noisy images, to decompose the corrupted data into two general components, one representing valid/characteristic components (e.g., valid data) of the data and the other representing noises and/or outliers (e.g., error data) of the data. For example, when the first feature data is an aggregated matrix or image, RPCA is applied to decompose it into two matrices or images, one representing valid data and the other representing error data. The use of the second feature data by RPCA effectively reduces noises and outliers from the first feature data.

In some implementations, the second feature data can be part or whole of the valid data of the first feature data processed by RPCA, and the data removed from the first feature data using RPCA can be error data of the first feature data. In the addition, the data removed can include, if any, the discarded part of the valid data of the first feature data (e.g., outliers).

In some implementations, an ordering operation can be further performed on the valid data determined from the first feature data using RPCA, and the second feature data can be the top portion of the valid data (a first set of principle components), after the ordering operation has been performed on the valid data.

In an example, the ordering operation can reduce the matrix representing valid data (e.g., a valid signal matrix) into a row echelon form, and the top portion can be the top K rows of the row echelon form, in which K is an integer not greater than the rank of the signal matrix. For example, for a valid signal matrix including representation of N ECG periodic fragments after RPCA reduction, the selection of top K rows can generate, as a result, a new K*N feature matrix or image. K and N can be any integer numbers, and the ordering operation and the selection of the top portion are not limited to the examples set forth in the above description.

Figure 10:
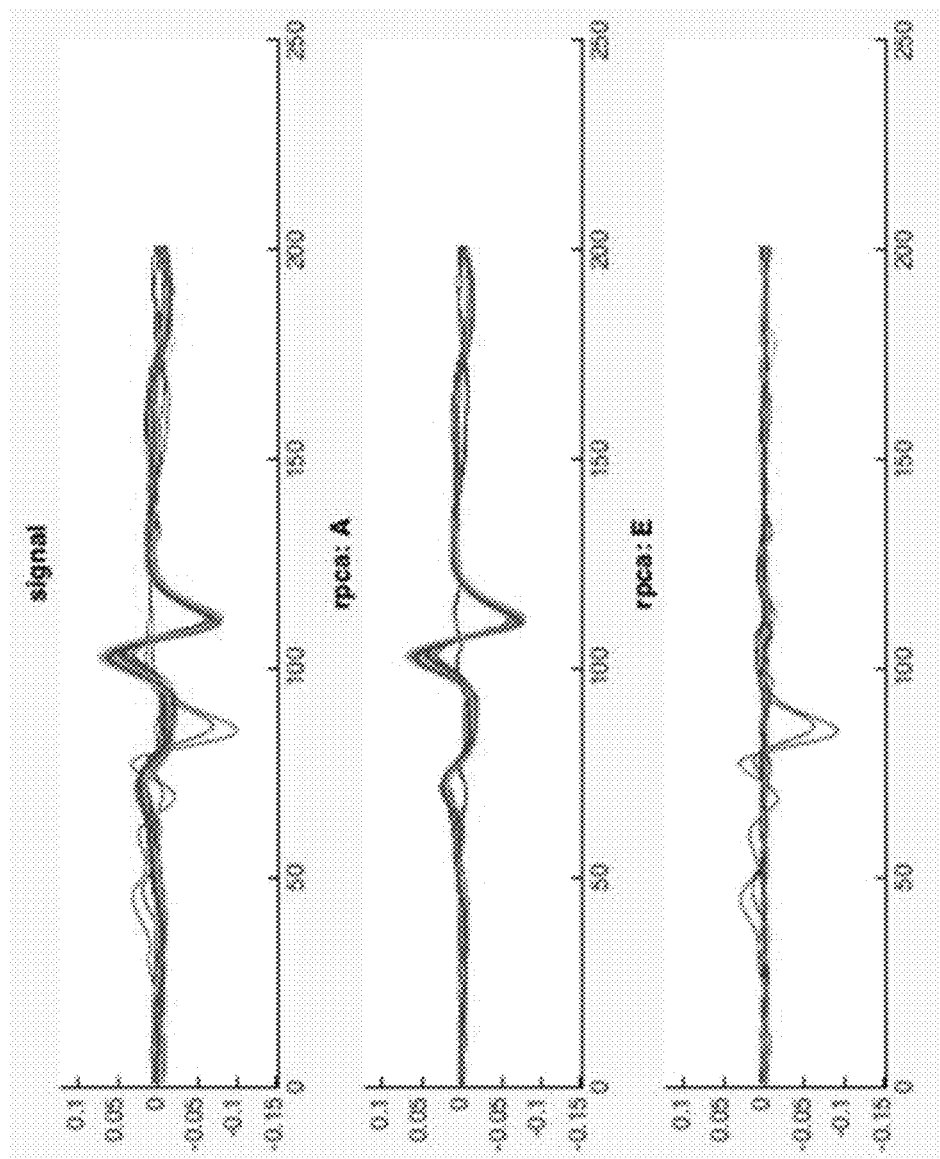
FIG. 10 is a graph showing example feature data extracted from an ECG signal, and decomposition of the feature data as a result of using robust principal component analysis (RPCA) according to implementations of this disclosure.

For example, FIG. 10 is a graph showing example feature data extracted from an ECG signal, and decomposition of the feature data as a result of using robust principal component analysis (RPCA) according to implementations of this disclosure. In FIG. 10, the top image represents an aggregated matrix as the first feature data, which can be an aggregated image of a plurality of periodic fragments extracted from an ECG signal measured by biometric identification device 110 for a user. In some implementations, RPCA followed by an ordering operation can be applied to the top image to decompose it into an image representing valid data (e.g., a valid image) and another image representing noises and outliers (e.g., an error image). The middle image of FIG. 10 is an example valid image. The bottom image of either FIG. 10 is an example error image that shows noises and outliers of the aggregated image after applying RPCA.

In some implementations, the representations of the extracted periodic fragments can be in other forms. For example, the second feature data can be determined from the first feature data using RPCA, and the results can be converted to visual representations for illustration purposes.

At operation 610, whether a match exists between the second feature data and defined biometric data associated with a known individual is determined by processing the second feature data and the defined biometric data using an image processing technique. The image processing technique can include, for example, a machine learning technique, such as a deep learning (DL) technique, as will be described below. If the match exists, process 600 proceeds to operation 612; otherwise, process 600 can go back to operation 602. In some implementations, before the determination, the defined biometric data associated with the known individual is generated in a training process by the following steps: firstly, data based on periodic fragments associated with the known individual and extracted during a setup process is received; secondly, the defined biometric data (e.g., template data) is generated from the data based on periodic fragments associated with the known individual using a same technique used to determine the second feature data.

In some implementations, the defined biometric data can be the second feature data associated with the known individual, and the data based on periodic fragments associated with the known individual can be the first feature data associated with the known individual. The data can be extracted using the same technique used to generate the first feature data set forth in the description of operation 606, and the defined biometric data can be generated using the same technique used to generate the second feature data set forth in the description of operation 608. The setup process is implemented to define an association formed between the known individual and the defined biometric data, after which the association is used as the basis of determining a match between the known individual and an individual being identified (e.g., a current user in contact with device 110).

In some implementations, the image processing technique comprises a deep learning (DL) technique. The implemented DL technique, as either supervised or unsupervised, can work as a DL model taking one or more inputs and providing one or more outputs. Further, the DL model can have a capability of classifying images, which means outputting a text, numerical or symbolic label for an input image. Output label from a limited group that is pre-determined can be selected before a training process for the DL model. Various DL model can be used as image classifiers, such as convolutional neural networks (CNN), deep belief networks, stacked denoising auto-encoders, or deep Boltzmann machines. However, implementations of image processing techniques are not limited to DL techniques. Other techniques for image processing can be used in place of, or in combination with DL techniques.

In some implementations, the DL technique used can include a CNN model. A CNN model is a DL model including nodes (e.g., artificial neurons) structured in a plurality of interconnected layers. A node can be used for outputting a value based on a plurality of input values; the function associates each input value with an independent weight that can be updated. The decision process of the CNN can be used for classification. For example, the bottom layer of the CNN can take initial input data, such as an image or matrix, and the top layer of the CNN can output a label representing a decision made for the initial input data by the CNN, such as a category of the image.

During a supervised training method for the CNN model, for example, a set of data (e.g., a training set) can be used as inputs to the CNN model for classification. Each input of the training set is assigned with a pre-determined label (ground truth labels) for determining whether the classification of the CNN is correct. Based on the comparison of the output labels and ground truth labels, the weights of nodes can be updated for optimization. A CNN model trained by such a process can be used as a classifier for other input data of the same type with the training set.

In some implementations, the CNN model can take the second feature data associated with the user (e.g., valid feature data after RPCA) and the defined biometric data associated with the known individual (e.g., template data) as input data, and provide an output label as a result of deciding whether a match exists between the second feature data and the defined biometric data. For example, the output label can be text of "match" or "not match", or any numerical or symbolic label, or indication that is assigned the meaning of "match" or "not match". For another example, the output label can be a name, a profile, a username, a password, or any information that is associated with a user.

In some implementations, input data for the CNN model can be prepared in various ways based on extracted periodic fragments. In some implementations, a periodic fragment extracted from biometric data associated with the user (e.g., a signal fragment) can be combined with another periodic fragment extracted from biometric data associated with the known individual (e.g., a defined fragment). For example, N signal fragments and N defined fragments can be paired and stacked to form a 2*N image, which can be used as input data for the CNN model to generate an output label.

In some implementations, the CNN model can use a difference matrix or image as a sole input, in which the difference matrix or image is determined as the difference between the second feature data associated with the user and the defined biometric data associated with the known individual. For example, the second feature data can be the feature matrix associated with the user (e.g., a user feature matrix), and the defined biometric data can be the feature matrix associated with the known individual (e.g., a defined feature matrix). Accordingly, the difference matrix can be a matrix that captures the difference of characteristics between the two matrices. For example, the difference matrix can be a K*N matrix generated by subtracting a K*N defined feature matrix from a K*N user feature matrix, or vice versa.

As an example, FIG. 7 shows a flowchart of a method for comparing an ECG signal of a user with an ECG signal of a known individual according to implementations of this disclosure. In this example, a difference matrix is determined based on an ECG signal of a user and an ECG signal of a known individual. Process 700 can be used either in a setup process or in a practical scenario (e.g., testing process) such as real-time identification of a user. A trained CNN model can take on, as input, a difference matrix generated as a result of process 700, and output a label (e.g., "match" or "not match") for the real-time identification of the user in a test.

At operation 702, the ECG signal of the user is received.

At operation 704, the ECG signal of the known individual is received.

At operation 706, feature extraction operations, which can include, for example operations 604-608, are performed separately for the two ECG signals.

At operation 708, a feature matrix for the user is determined, namely a user feature matrix.

At operation 710, a feature matrix for the known individual is also determined, namely a defined feature matrix.

At operation 712, a difference matrix is determined between the user feature matrix and the defined feature matrix.

In some implementations, after the difference matrix is determined, the CNN model can decide whether a match exists or not between the user feature matrix and the defined feature matrix based on the difference matrix, and provide a label representing the decision. If the output label is "match" or equivalent, the user and the known individual is considered to be the same person; otherwise, if the output label is "not match" or equivalent, the user and the known individual is considered to be different persons.

In some implementations, prior to testing (e.g., real-time identification), the CNN model can be trained in the setup process that can be illustrated as a flowchart in FIG. 8 according to implementations of this disclosure. A set of difference matrices generated by process 700 can be used as training data (e.g., a training set) for the CNN model. The difference matrices are determined between biometric data associated with the two individuals, in which the two individuals can be either the same person or different persons. Each difference matrix can come with a ground truth label, representing the relationship between the two individuals (e.g., "match" or "not match"). Both the difference matrices and the ground truth labels can be used as training data for the CNN model during the setup process.

At operation 802, a difference matrix determined as in operation 712 is input to the CNN model. The weights of nodes of the CNN model are initialized with values. A label is output by the CNN model.

At operation 804, the label output at operation 802 is compared with the ground truth label that comes with the input difference matrix. If the output label is different from the ground truth label, the classification is incorrect, and the weights of the CNN are automatically updated and stored for use in next calculation. If the output label is the same as the ground truth label, the classification is correct and the weights are kept unchanged.

At operation 806, optionally, operations 802-804 can be performed for each difference matrix in the training set, repeated for at least one time. This process can be repeated until the rate of correct classification reaches a pre-determined level, such as, for example, 90%. In some implementations, this process can be repeated until a pre-determined running duration is reached without the rate of correct classification reaching the pre-determined level. When the repeated process ends, the CNN classifier completes the setup process and is ready for practical use.

FIG. 9 shows a flowchart of a method for determining whether a match exists using a difference matrix as an input for a CNN model according to implementation of this disclosure. Process 900 can be used either in a setup process or a real-time scenario for practical use.

At operation 902, a difference matrix is input to the CNN model. The difference matrix can be generated either in the setup process or during real-time identification of a user in contact with device 110.

At operation 904, a label of "match" or equivalent, or a label of "not match" or equivalent, is generated by the CNN model, which represents the identification result.

Back to FIG. 6, at operation 612, a signal indicating that the single individual is the known individual is transmitted using a communication channel. The signal can be transmitted by communication device 340. In some implementations, the transmitted signal can be used for further indication or identification. For example, the signal can be transmitted back to biometric identification device 110, which sends a visual, acoustic or haptic indication to the user. For another example, the signal can be transmitted to the intermediate device, which sends a visual, acoustic or haptic indication to the user. For another example, the signal can be transmitted to a device not belonging to the user for identification purpose, such as a gate control. For another example, the signal can be transmitted to an application running at a computing device, which further uses the signal to finish identification and authentication process for the user. However, implementations of the transmission of the signal for identification purpose are not limited to the examples given here.

In some implementations, biometric identification device 110 can be configured to have partial capability of executing the entire of process 600, e.g., a wristband shown in FIG. 4. Such device can execute some operation of process 600, e.g., operation 602, and have the rest of process 600 executed by an external server, being either computing device 112 or an intermediate device. In such implementation, biometric sensor 330 can be a biometric sensor coupled to body 420 to produce a biometric measurement signal when activated by contact with a user. Communication device 340 can be one or more communication device coupled to body 420 controlled by CPU 210 to wirelessly transmit the biometric measurement signal to an external server, wherein first feature data is generated based on periodic fragments extracted from the biometric measurement signal, wirelessly receive a first signal from the external server indicative of a biometric identification data generated from the biometric measurement signal, wherein the first signal is determined based on second feature data generated by removing data from the first feature data using RPCA, and the second feature data is compared with defined biometric data associated with a known individual using an image processing technique to determine whether a match exists indicating that the single individual is the known individual, and wirelessly transmit a second signal to an identification device in response to a match indicating that the user is the known individual.

In some implementations, communication device 340 can include a first wireless communication device configured to wirelessly transmit a biometric measurement signal from biometric sensor 330 to the external server and wirelessly receive the first signal from the external server indicative of a match exists indicating that the single individual is the known individual, and a second wireless communication device configured to wirelessly transmit a second signal to the identification device in response to the first signal.

In some implementations, biometric identification device 110 can be configured to have full capability of executing the entire of process 600, e.g., a "smart" watch shown in FIG. 5. In such implementations, CPU 210 is configured to execute instructions stored in memory 220 to receive a biometric measurement signal generated by biometric sensor 330 by contact with a user, extract periodic fragments from the biometric measurement signal, generate first feature data based on the extracted periodic fragments, determine second feature data from the first feature data by removing data from the first feature data using RPCA, determine whether a match exists between the second feature data and defined biometric data associated with a known individual by processing the second feature data and the defined biometric data using an image processing technique, and in response to determining a match exists between the second feature data and the defined biometric data, transmit a signal indicating that the single individual is the known individual. The image processing technique can be a DL technique that comprises a CNN model. The second feature data and the defined biometric data can be used as inputs to the CNN model to determine whether a match exists.

Optionally, in some implementations, the aforementioned biometric identification device 110 can further have the capability of generating the defined biometric data in a setup process. In such implementations, CPU 210 is configured to execute instructions stored in memory 220 to receive data based on periodic fragments associated with the known individual and extracted during the setup process, generate defined biometric data (e.g., template data) from the data based on periodic fragments associated with the known individual and extracted during the setup process using a same technique used to determine the second feature data, determine a valid feature set and an outlier feature set by performing RPCA on the first feature set and perform an ordering operation on the valid feature set to determine the second feature set that is determined using a top portion of the ordered valid feature set. The second feature set can be used as the defined biometric data herein.

Technical specialists skilled in the art should understand that, the implementations in this disclosure may be implemented as methods, systems, or computer program products. Therefore, this disclosure may be implemented in forms of a complete hardware implementation, a complete software implementation, and a combination of software and hardware implementation. Further, this disclosure may be embodied as a form of one or more computer program products which are embodied as computer executable program codes in computer writable storage media (including but not limited to disk storage and optical storage).

This disclosure is described in accordance with the methods, devices (systems), and flowcharts and/or block diagrams of computer program products of the implementations, which should be comprehended as each flow and/or block of the flowcharts and/or block diagrams implemented by computer program instructions, and the combinations of flows and/or blocks in the flowcharts and/or block diagrams. The computer program instructions therein may be provided to generic computers, special-purpose computers, embedded computers or other processors of programmable data processing devices to produce a machine, wherein the instructions executed by the computers or the other processors of programmable data processing devices produce an apparatus for implementing the functions designated by one or more flows in the flowcharts and/or one or more blocks in the block diagrams.

The computer program instructions may be also stored in a computer readable storage which is able to boot a computer or other programmable data processing device to a specific work mode, wherein the instructions stored in the computer readable storage produce a manufactured product containing the instruction devices which implements the functions designated by one or more flows in the flowcharts and/or one or more blocks in the block diagrams.

The computer program instructions may also be loaded to a computer or another programmable data processing device to execute a series of operating procedures in the computer or the other programmable data processing device to produce a process implemented by the computer, whereby the computer program instructions executed in the computer or the other programmable data processing device provide the operating procedures for the functions designated by one or more flows in the flowcharts and/or one or more blocks in the block diagrams.

Apparently, the technical specialists skilled in the art may perform any variation and/or modification to this disclosure by the principles and within the scope of this disclosure. Therefore, if the variations and modifications herein are within the scope of the claims and other equivalent techniques herein, this disclosure intends to include the variations and modifications thereof.

What is claimed is:

1. A method for processing a biometric measurement signal using a computing device, comprising:
    receiving, by the computing device from a biometric sensor, a biometric measurement signal generated by contact with a single individual, wherein the biometric measurement signal comprises an electrocardiogram (ECG) signal;
    extracting periodic fragments from the biometric measurement signal, wherein each periodic fragment is indicative of a complete heartbeat of the single individual and is represented by a vector, and wherein each periodic fragment is represented by an image;
    generating, by the computing device, first feature data by aggregating the periodic fragments, wherein the first feature data comprises an aggregated matrix generated by placing vectors representing the periodic fragments side by side;
    determining, by the computing device, second feature data by removing noise data and outliers from the first feature data using robust principal component analysis, wherein the second feature data comprises a valid data matrix generated by removing the noise data and the outliers from the aggregated matrix;
    generating an aggregated image by stacking images of the periodic fragments associated with the second feature data;

determining, at the computing device, a difference image as a difference between the aggregated image and a second aggregated image representing defined biometric data;

inputting the difference image into a neural network, wherein the neural network is trained using difference images and associated ground truth labels, the ground truth labels representing respective relationships between two individuals; and in response to the neural network outputting a label indicating that a match exists between the second feature data and the defined biometric data, transmitting, using a communication channel to a device for identification and authentication of the single individual, a signal indicating that the single individual is a known individual.

2. The method of claim 1, wherein the neural network comprises a convolutional neural network (CNN) model, and the second feature data and the defined biometric data are used as inputs to the CNN model to determine whether the match exists.

3. The method of claim 1, further comprising:
receiving third feature data generated by aggregating periodic fragments extracted during a setup process from a second biometric measurement signal associated with the known individual; and
determining the defined biometric data by removing noise data and outliers from the third feature data using the robust principal component analysis.

4. The method of claim 1, wherein the biometric measurement signal further comprises at least one of an electroencephalography (EEG) signal, a photoplethysmography (PPG) signal, an electromyography (EMG) signal.

5. The method of claim 1, wherein the periodic fragments comprise PQRST fragments.

6. The method of claim 1, wherein the device for identification and authentication comprises one of the computing device and a remote server.

7. The method of claim 1, further comprising:
ordering the valid data matrix into a row echelon form; and
selecting top K rows of the row echelon form as the second feature data, wherein K is an integer not greater than a rank of the aggregated matrix.

8. The method of claim 7, wherein the device for identification and authentication comprises a gate control.

9. An apparatus for processing a biometric measurement signal, comprising:
a non-transitory memory; and
a processor configured to execute instructions stored in the non-transitory memory to:
receive, from a biometric sensor coupled to a wearable device, a biometric measurement signal generated by contact with a single individual, wherein the biometric measurement signal comprises an electrocardiogram (ECG) signal;
pre-process the biometric measurement signal to remove baseline wander from the biometric measurement signal;
extract periodic fragments from the biometric measurement signal, wherein each periodic fragment is indicative of a complete heartbeat of the single individual and is represented by a vector;
generate first feature data by aggregating the periodic fragments, wherein the first feature data comprises an aggregated matrix generated by placing vectors representing the periodic fragments side by side;

determine second feature data by removing noise data and outliers from the first feature data using robust principal component analysis, wherein the second feature data comprises a valid data matrix generated by removing the noise data and the outliers from the aggregated matrix;

determine a difference matrix as a difference between the valid data matrix and a matrix representing defined biometric data;

input the difference matrix into a neural network, wherein the neural network is trained using difference matrices and associated ground truth labels, the ground truth labels representing respective relationships between two individuals; and in response to the neural network outputting a label indicating that a match exists between the second feature data and the defined biometric data, transmit, using a communication device to a device for identification and authentication of the single individual, a signal indicating that the single individual is a known individual.

10. The apparatus of claim 9, further comprising:
a body of the apparatus; wherein
the biometric sensor coupled to the body to produce the biometric measurement signal when activated by contact with the single individual; and
the communication device coupled to the body and controlled by the processor to transmit the signal, to a reader device, indicating that the single individual is the known individual.

11. The apparatus of claim 9, wherein the instructions further comprise instructions to:
receive third feature data generated by aggregating periodic fragments extracted during a setup process from a biometric measurement signals associated with the known individual;
determine the defined biometric data by removing noise data and outliers from the third feature data using the robust principal component analysis;
order the valid data matrix into a row echelon form; and
select top K rows of the row echelon form as the second feature data, wherein K is an integer not greater than a rank of the aggregated matrix.

12. The apparatus of claim 9, wherein the biometric measurement signal comprises at least one of an electroencephalography (EEG) signal, a photoplethysmography (PPG) signal, an electromyography (EMG) signal.

13. The apparatus of claim 9, wherein the periodic fragments comprise PQRST fragments.

14. The apparatus of claim 9, wherein the neural network comprises a deep learning (DL) model, the DL model comprises a convolutional neural network (CNN) model.

15. A system, comprising:
a wearable apparatus comprising:
a body of the wearable apparatus, coupled to a securing mechanism for securing the wearable apparatus to a portion of a single individual;
a biometric sensor coupled to the body of the wearable apparatus and positioned on the portion of the single individual, configured to receive a biometric measurement signal comprising an electrocardiogram (ECG) signal when the biometric sensor is activated by contact with the single individual; and
a first communication device coupled to the body of the wearable apparatus;

a computing device comprising:
  a second communication device, configured to communicate with the first communication device;
  a memory; and
  a processor coupled to the memory configured to execute instructions stored in the memory to:
    wirelessly receive the biometric measurement signal from the first communication device;
    pre-process the biometric measurement signal to remove baseline wander from the biometric measurement signal;
    extract periodic fragments from the biometric measurement signal, wherein each periodic fragment is indicative of a complete heartbeat of the single individual and is represented by a vector;
    generate first feature data by aggregating periodic fragments, wherein the first feature data comprises an aggregated matrix generated by placing vectors representing the periodic fragments side by side;
    determine second feature data by removing noise data and outliers from the first feature data using robust principal component analysis, wherein the second feature data comprises a valid data matrix generated by removing the noise data and the outliers from the aggregated matrix;
    determine a difference matrix as a difference between the valid data matrix and a matrix representing defined biometric data;
    input the difference matrix into a convolutional neural network (CNN) model, wherein the CNN is trained using difference matrices and associated ground truth labels, the ground truth labels representing respective relationships between two individuals; and
  in response to the CNN model outputting a label indicating that a match exists between the second feature data and the defined biometric data, wirelessly transmit a signal to an external server for identification and authentication of the single individual indicating that the single individual is a known individual.

* * * * *